Sept. 10, 1935. T. F. BAKER Re. 19,692

SOUND RECORDING MACHINE

Original Filed May 3, 1932 4 Sheets-Sheet 1

INVENTOR

Thomas F. Baker

BY HIS ATTORNEY

E. E. Murdock

SOUND RECORDING MACHINE

Original Filed May 3, 1932 4 Sheets-Sheet 2

INVENTOR

Thomas F. Baker

BY HIS ATTORNEY

E. E. Muldorn

SOUND RECORDING MACHINE

Original Filed May 3, 1932 4 Sheets-Sheet 3

INVENTOR

*Thomas F. Baker*

BY HIS ATTORNEY

E. G. Mudgett

SOUND RECORDING MACHINE

Original Filed May 3, 1932 4 Sheets-Sheet 4

INVENTOR

*Thomas F. Baker*

BY HIS ATTORNEY

*E. Mudock*

Reissued Sept. 10, 1935 Re. 19,692

UNITED STATES PATENT OFFICE 19,692

SOUND RECORDING MACHINE

Thomas F. Baker, Albany, N. Y., assignor, by direct and mesne assignments, of one-third to Robert M. Lackey, Waterford, N. Y., and two-thirds to Michael Speigel, Albany, N. Y.

Original No. 1,978,448, dated October 30, 1934, Serial No. 608,908, May 3, 1932. Application for reissue July 24, 1935, Serial No. 32,974

3 Claims. (Cl. 274—17)

Among the principal objects which the present invention has in view are: to minimize the space occupied by the mechanism; to reduce the weight of the structure, and to produce a portable machine of the character mentioned.

Figure 1:
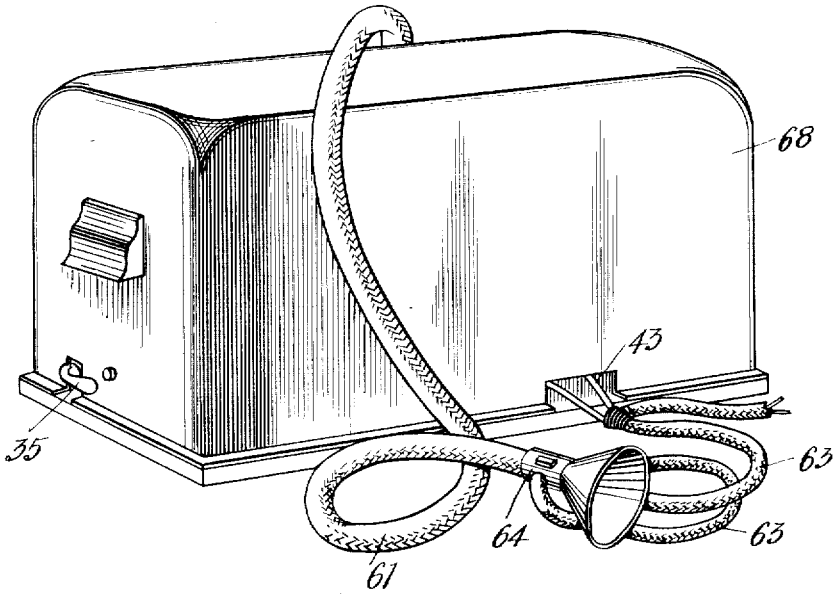
Figure 1 is a perspective view of a sound recording machine constructed and arranged in accordance with the present invention, same being shown as covered for transportation.
Figure 2:
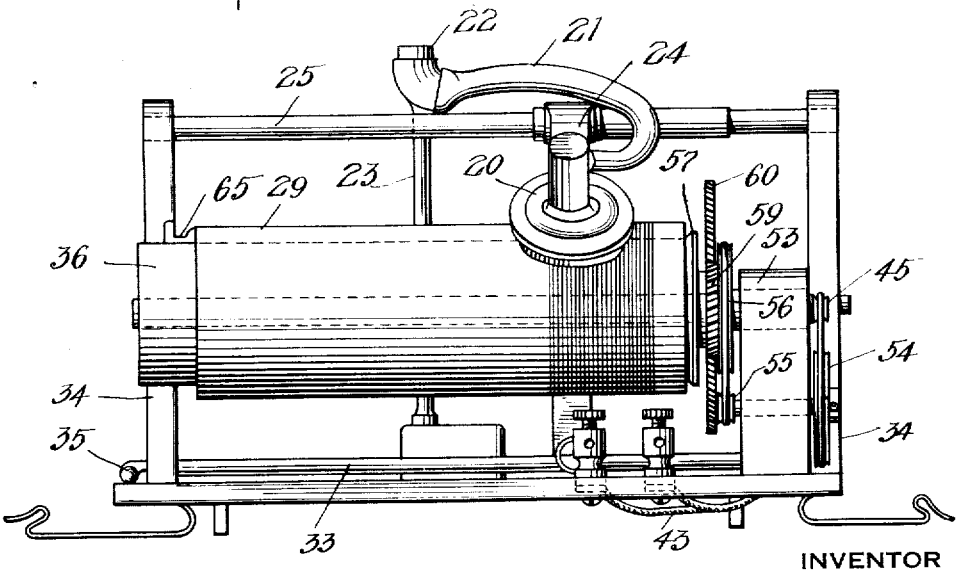
Figure 2 is a front side view of the same, the cover being removed.
Figure 3:
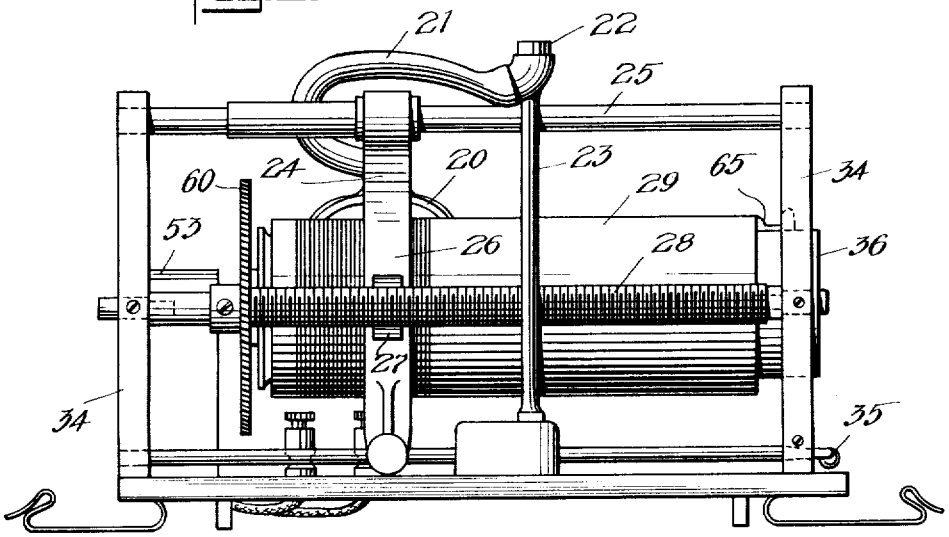
Figure 3 is a rear side view of the same.
Figure 4:
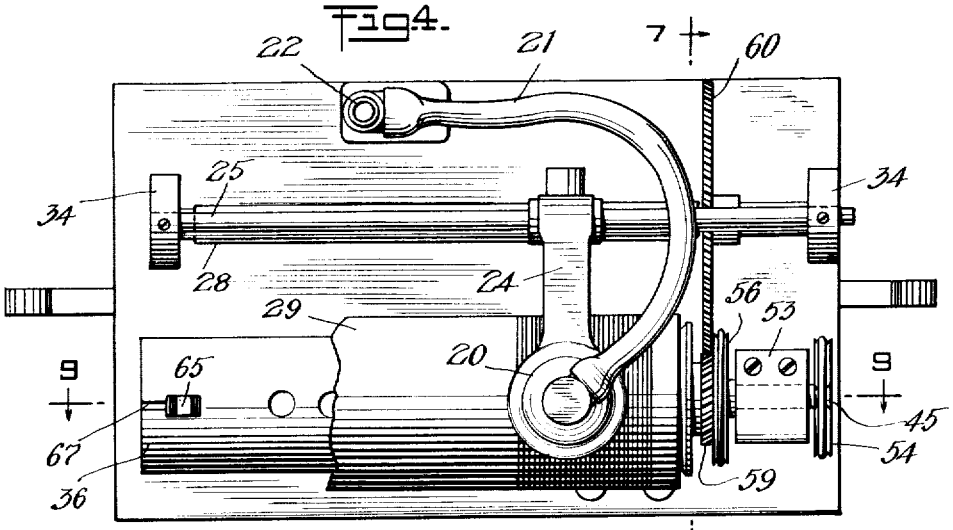
Figure 4 is a plan view showing the recording cylinder as partly cut away to show the supporting mandrel for said cylinder.

The present apparatus is especially designed with reference to obtaining compactness and lightness in weight.

One particular service for which it is designed illustrates particularly the need of both of the aforesaid features.

The service referred to is that of a temporary installation in police cars, whereby records may be made while the car is in motion and the apparatus may be removed when the officer leaves the vehicle.

While this particular use is mentioned to illustrate the need for the compactness and reduction in weight, it will be understood that there are many other uses to which the apparatus may be put to advantage incident to said features.

As in the well-known commercial instruments, the present apparatus employs a cutting stylus 20. This stylus is of usual construction and is here connected by means of a flexible pipe 21 to a pipe connection 22 which is mounted upon a standard 23.

While I have herein shown the stylus 20 to be of the cutting type only, it will be understood that where it is desired, the well-known repeating diaphragm may be associated with the said stylus 20 and the pipe 21, and that the well-known arrangement whereby, when the cutting stylus 20 is removed from service, the repeating diaphragm will be thrown into service, may also be employed.

In the present apparatus, the stylus 20 is mounted at the end of the carrying arm 24 which is slidably mounted on the guide rod 25. An extension 26 of the carrying arm 24 is provided with a threaded boss 27 suitably threaded in segments to engage the threads on the feeder bar 28. When the boss 27 is engaged with the bar 28, the stylus is moved in uniformity with the threads on the said feeder bar, and if lowered into contact with the cylinder 29, the cutter of the stylus will cut into the said cylinder and at varying depths in accordance with the impulses imparted thereto by the speaking phone as in the usual phonographic machines.

Figure 6:
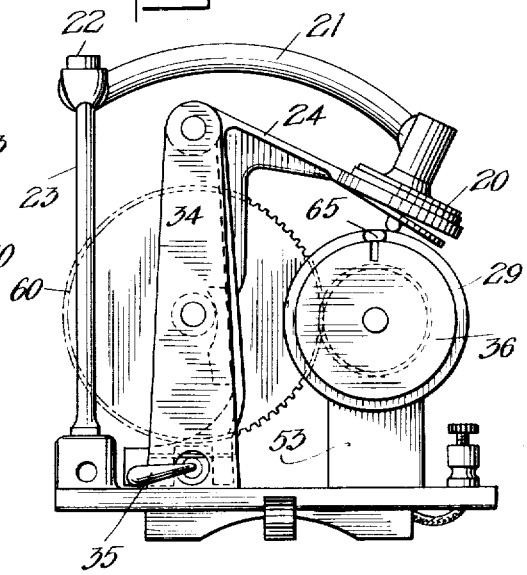
Figure 6 is a similar view as seen from the opposite end of the apparatus.
Figure 7:
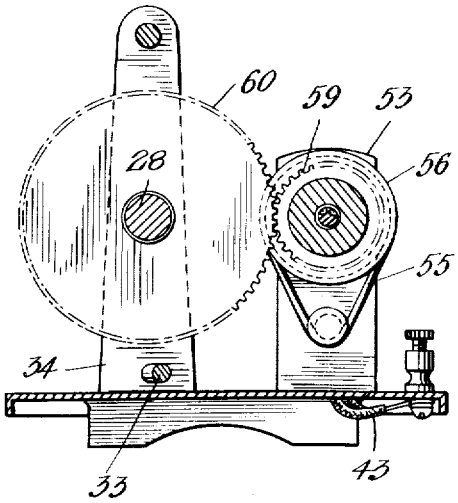
Figure 7 is a vertical section, the section being taken as on the line 7—7 in Figure 4.
Figure 8:
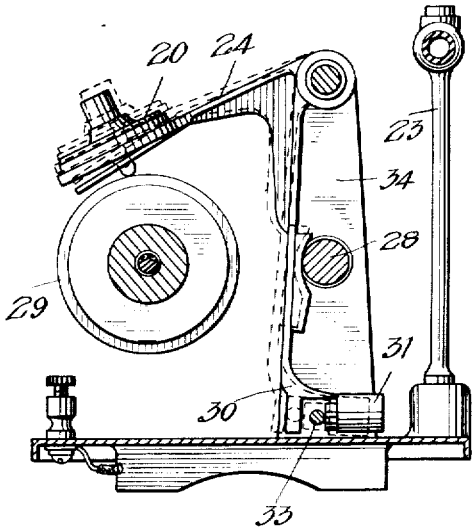
Figure 8 is a vertical section, the section being taken as on the line 8—8 in Figure 4.

To lift the stylus 20 from the cylinder 29, and the boss 27 from engagement with the feeder bar 28, I prolong the extension 26 to provide a footpiece 30 and a locking cylinder 31 thereon. The cylinder 31 is hollowed to receive a plunger 32 which is seated upon a spring, the office of which is to keep the plunger pressed against the rocker arm 33. The arm 33, as best seen in Figure 7 of the drawings, is off-set from its bearings in the standards 34 on which the feeder bar 28 and the guide rod 25 are mounted. Off-setting the rod in this manner, gives a cam-like action when the said rod is rocked by means of the handle 35, as best seen in Figure 6 of the drawings.

In service, the handle 35 is manipulated to lower or raise the stylus 20 into and out of service contact with the cylinder 29.

Figure 9:
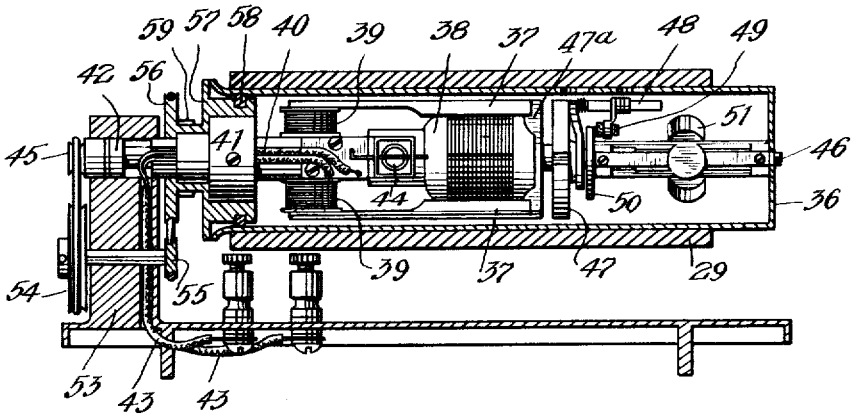
Figure 9 is a longitudinal section showing the recording cylinder, supporting mandrel therefor and the motor for operating the same contained therein, the section being taken as on the line 9—9 in Figure 4.
Figure 12:
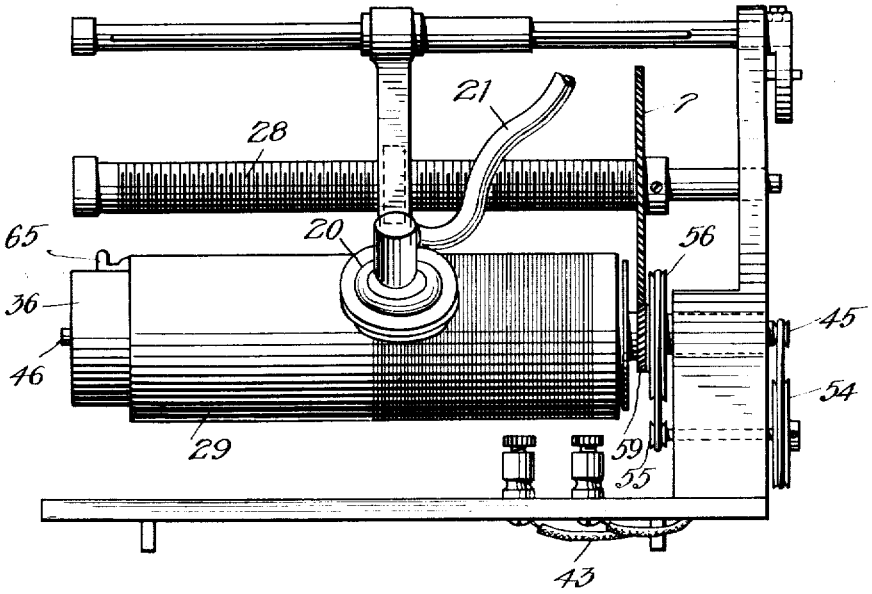
Figure 12 is a side view of the apparatus, showing a modified form thereof.

The cyllinder 29 is mounted on a mandrel 36 which is driven or rotated by means of an electric motor mounted and contained within the said mandrel, as seen best in Figure 9 of the drawings.

The motor referred to has field pieces 37 shaped cylindrically to fit within the mandrel 36 and to encompass therebetween the armature 38. The field pieces 37 and the field windings 39 thereof are rigidly supported in an extension 40. The extension 40 has a collar 41 and a grooved section 42, through which the electric wires 43 extend to the brushes 44 for the armature 38. The extension 40, collar 41 and the grooved section 42 are all centrally bored to provide a bearing for the shaft of the armature 38, which shaft has as its outer extremity, the small pulley 45 at the one end thereof, and a pintle bearing 46 at the opposite end thereof.

The armature shaft is further provided with a bearing in the partition 47 whereon is mounted a small standard 48 for supporting the brake shoe 49. The partition 47 is stationarily and rigidly mounted on the cross member 47a connecting the fields 37.

The shoe 49 is spring mounted and held in position juxtaposed by a disc 50 which is slidably mounted on the armature shaft and is operatively connected with the centrifugal weights 51.

When the motor is operated, the field pieces 37, and apparatus directly associated therewith, are permanently stationary, while the armature 38 and shaft associated therewith, rotate, the current being supplied to said field pieces and armature by means of the wires 43. As the speed increases beyond a predetermined rate, the weights 51 spread, and in so doing, draw the disc 50 into contact with the stationary brake shoe 49. A drag is thus imposed upon the motor with the result that the motor is slowed down. The reverse, of course, is true, to wit, that as the rate slows, the weights 51 are drawn to their closed position, wherein the disc 50 is freed from the brake shoe 49. The motor rotates the mandrel 36, and the cylinder 29 mounted thereon, through a reducing transmission consisting of a pulley 45 at the end of the armature shaft, where the same extends beyond the main standard 53, and a larger pulley 54 which is mounted on the short shaft extending through the main standard 53, where it is provided with a small pulley 55. The pulley 55 is belted to the larger pulley 56 that is integrally connected with the supporting head 57, over which the mandrel 36 is forced, to be held by the rubber gasket 58. By means of this reduction, the rotary speed of the mandrel 36 is very much reduced below that of the armature 38.

It will be understood that while I have herein shown the pulleys 45 and 54, and 55 and 56 coupled by means of belts, other preferred forms of gearing may be employed.

The feeder bar 28 is driven or rotated in time relation with the mandrel 36 by means of transmission gears 59 and 60, the former being relatively small, and the latter relatively large.

The gears as shown in the drawings are preferably of the type known as spiral gears, and for the well-known reason that they are of the noiseless type.

As the said feeder bar is rotated, the extension 26 and arm 24, together with the stylus 20, are moved lengthwise of the mandrel, provided of course that the handle 35 of the rocker arm has been properly set to engage the threads of the threaded boss with the threads of the said feeder bar.

In service, the pipe connection 22 receives the speaking tube pipe 61, at the free end of which is preferably provided a funnel-shaped mouthpiece 62.

As seen best in Figure 1 of the drawings, the electric current supplied to the motor is controlled through the electric wires 43, the leads 63 and the hand-controlled switch 64, all of the usual construction and manipulation.

Figure 10:
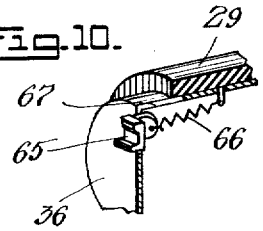
Figure 10 is a detailed view in perspective showing the detent for holding the recording cylinder in service, the detent being shown in its out-of-service position.
Figure 11:
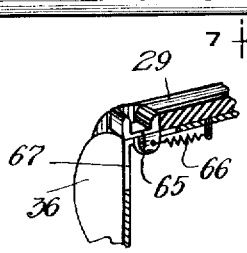
Figure 11 is a similar view showing the detent as in service position.
Figure 5:
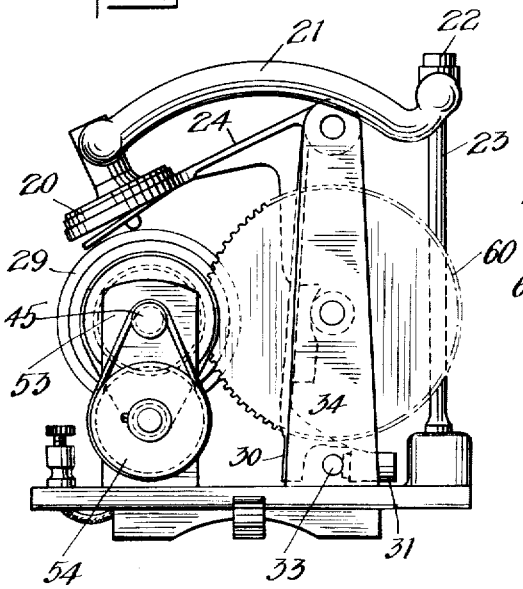
Figure 5 is an end view showing the reducing gears for feeding the stylus.

The cylinder 29 is held in service by means of a pressure foot 65 which, as best seen in Figures 10 and 11 of the drawings, is driven against the cylinder 29 by a spring 66. The groove 67 formed in the end of the mandrel 36 serves as a guide for the said pressure foot 65.

Where desired, the machine may be provided with a protective cover 68, such as seen in Figure 1 of the drawings.

As above stated, one of the special uses for which the present sound recording machine is desired, is that of light portable service such as might be employed in conjunction with automobiles, such as automobiles used by the police, where, to be serviceable, the apparatus should be sufficiently portable to be removed from the vehicle when the driver or owner is leaving the same.

Also, as a result of the diminished size and weight, the apparatus may be carried in a train when traveling, or be used upon an extensible bracket in an office. The facility with which the apparatus can be moved, lends greatly to its value, and adds to the usefulness thereof.

I claim:

1. A sound recording machine comprising a mandrel for supporting a record cylinder, an electric motor totally encompassed within said mandrel for rotating the same, and a speed governor for said motor, said governor being within said mandrel.

2. A sound recording machine comprising a mandrel for supporting a record cylinder, an electric motor totally encompassed within said mandrel for rotating the same, and a speed governor for said motor disposed within said mandrel and embodying centrifugal weights adapted to spread in correspondence with the speed of the aramture of said motor.

3. In a sound recording machine, a mandrel for supporting a record cylinder, said mandrel having self-contained motive power, and self-contained means for controlling the speed of said mandrel.

THOMAS F. BAKER.